(12) United States Patent
Foley et al.

(10) Patent No.: US 9,945,666 B2
(45) Date of Patent: Apr. 17, 2018

(54) NARROWBAND TRANSMISSION FILTER

(71) Applicant: The Regents of The University of Michigan, Ann Arbor, MI (US)

(72) Inventors: Justin Foley, Ann Arbor, MI (US); Jamie D. Phillips, Ann Arbor, MI (US); Steve Young, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 409 days.

(21) Appl. No.: 14/592,247

(22) Filed: Jan. 8, 2015

(65) Prior Publication Data
US 2015/0192271 A1  Jul. 9, 2015

Related U.S. Application Data

(60) Provisional application No. 61/924,882, filed on Jan. 8, 2014.

(51) Int. Cl.
*G02B 5/18* (2006.01)
*G01C 7/00* (2006.01)

(52) U.S. Cl.
CPC ............. *G01C 7/00* (2013.01); *G02B 5/1866* (2013.01)

(58) Field of Classification Search
CPC .......................................... G02B 5/18–5/1895
See application file for complete search history.

(56) References Cited

U.S. PATENT DOCUMENTS

| 4,255,019 A | 3/1981 | Knop |
| 4,484,797 A | 11/1984 | Knop et al. |
| 5,283,690 A * | 2/1994 | Miyake ................ G02B 5/1814 359/566 |

(Continued)

FOREIGN PATENT DOCUMENTS

| EP | 1145052 A2 | 10/2001 |
| WO | WO-1993001510 A1 | 1/1993 |

(Continued)

OTHER PUBLICATIONS

Ding, Y., et al., "Doubly Resonant single-layer bandpass optical filters", 2004 Optical SOciety of America, May 15, 2004, vol. 29, No. 10 Optics Letters.

(Continued)

*Primary Examiner* — Bumsuk Won
*Assistant Examiner* — Jeffrey Madonna
(74) *Attorney, Agent, or Firm* — Harness, Dickey & Pierce, P.L.C.

(57) ABSTRACT

A narrowband transmission system includes a dielectric grating that defines a surface and includes a plurality of longitudinal members arranged along an axis. The longitudinal members are surrounded by a medium. The longitudinal members are made of a material that has an index of refraction that is greater than an index of refraction of the medium. The dielectric grating is configured to receive radiation at the surface. The system further includes a means for breaking a symmetry between the radiation and the dielectric grating such that the dielectric grating transmits a given wavelength band of the radiation through the dielectric grating while rejecting remainder of wavelengths embodied in the radiation.

22 Claims, 11 Drawing Sheets

(56) References Cited

U.S. PATENT DOCUMENTS

| | | | |
|---|---|---|---|
| 5,726,805 A * | 3/1998 | Kaushik | G01J 3/02 |
| | | | 359/489.19 |
| 7,755,835 B2 | 7/2010 | Stuck et al. | |
| 7,821,691 B2 | 10/2010 | Walter et al. | |
| 7,864,424 B2 | 1/2011 | Stuck et al. | |
| 7,974,010 B2 | 7/2011 | Walter et al. | |
| 9,097,993 B2 * | 8/2015 | Bakker | G03F 7/70575 |
| 9,423,539 B2 * | 8/2016 | Fattal | G02B 5/08 |
| 2004/0021945 A1 * | 2/2004 | Tompkin | G02B 5/18 |
| | | | 359/566 |
| 2004/0136073 A1 * | 7/2004 | Shiozaki | G02B 5/1866 |
| | | | 359/569 |
| 2004/0264859 A1 * | 12/2004 | Nagashima | G02B 5/1814 |
| | | | 385/37 |
| 2009/0257126 A1 * | 10/2009 | Walter | B44F 1/10 |
| | | | 359/568 |

FOREIGN PATENT DOCUMENTS

| | | |
|---|---|---|
| WO | WO-1998057200 A1 | 12/1998 |
| WO | WO-2001001530 A1 | 1/2001 |

OTHER PUBLICATIONS

Kanamori, Yoshiaki, et al., "Fabrication of Transmission Color Filters Using Silicon Subwavelength Gratings on Quartz Substrates", 1041-1135 2006 IEEE Photonics Technology Letters, vol. 18, No. 20, Oct. 15, 2006.

M. Amin, et al. "Optical transmission filters with coexisting guided-mode resonance and Rayleigh anomaly", Applied Physics Letters 103, 131106 (2013).

Magnussen R., et al., "New principle for optical filters", Applied Physics Letters 61, 1022, Aug. 31, 1992.

* cited by examiner

NARROWBAND TRANSMISSION FILTER

CROSS-REFERENCE TO RELATED APPLICATIONS

This application claims the benefit of U.S. Provisional Application No. 61/924,882, filed on Jan. 8, 2014. The entire disclosure of the above application is incorporated herein by reference.

FIELD

The present disclosure relates to a narrowband transmission filter.

BACKGROUND

This section provides background information related to the present disclosure which is not necessarily prior art.

Over the past two decades, photonic crystals have enabled studies of many interesting physical phenomena and have been increasingly used in applications. These periodic structures possess band structures that can be exploited to engineer the electromagnetic response of a given system, and are analogous to the electronic bands of crystalline materials.

A specific class of photonic crystals have their periodicity confined to a thin layer that is surrounded by a low-index material; consequently they have bands that extend into the light cone. These leaky modes can be excited by incident plane waves to produce Fano line shapes and similarly decay into the continuum when the excitation source is removed. The lifetime of an excited mode and its associated coupling strength to the continuum is largely determined by the mutual symmetry of the mode and permissible outgoing waves. Select modes possess infinite lifetimes at zone center as a result of their symmetry mismatch with allowed radiation modes.

These symmetry-protected modes have recently been used to demonstrate high-quality factor resonances near normal incidence that may be exploited for various applications. Particular one-dimensional photonic crystal slabs, often called high-contrast gratings, have demonstrated spectral engineering capabilities including ultra-broadband reflectors, two-dimensional lenses, and filters.

SUMMARY

This section provides a general summary of the disclosure, and is not a comprehensive disclosure of its full scope or all of its features. A narrowband transmission filtering system includes a dielectric grating that receives radiation from a light source. The dielectric grating defines a surface and includes a plurality of longitudinal members arranged in parallel along an axis. The plurality of longitudinal members has an index of refraction that is greater than a medium surrounding the longitudinal members, and thus acts as a periodic waveguide. The system includes a means for breaking a symmetry between the radiation and the dielectric grating such that the dielectric grating transmits a given wavelength band of the radiation through the dielectric grating while rejecting remainder of wavelengths embodied in the radiation.

Dimensions of the dielectric grating may be optimized to enable strong coupling to select modes and yields a broad reflectance band that acts as the low transmittance background of the filtering system. By subsequently breaking a mutual symmetry between the radiation and the dielectric grating, weak coupling to modes that were previously symmetry protected may be attained. This weak coupling produces interference between the strongly and weakly coupled modes resulting in narrow transmission bands within the previously established opaque background.

In an aspect of the present disclosure, the symmetry may be broken by having the dielectric grating receive the radiation at the surface at a non-zero angle of incidence.

The present disclosure further provides for a narrowband transmission filter that includes a dielectric grating defining a surface and having an asymmetrical cross-section. The dielectric grating includes a plurality of longitudinal members that are surrounded by a medium. The plurality of longitudinal members is made of a material that has an index of refraction that is greater than an index of refraction of the medium. The dielectric grating is arranged such that the surface receives radiation at an angle of incidence. The dielectric grating is operable to transmit a given wavelength band of the radiation through the dielectric grating while rejecting remainder of wavelengths embodied in the radiation. In this example, the symmetry between the dielectric grating and the radiation is broken by the structure of the dielectric grating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The present disclosure shows that narrowband features are based on an entirely different set of resonances than those used in, for example, ultra-broadband reflectors. More particularly, the present disclosure discloses narrowband transmission by breaking symmetry between radiation and a dielectric grating that receives the radiation. The disclosure further describes symmetry-based selection rules for coupling to a set of transverse magnetic (TM) and/or a set of transverse electric (TE) modes. In a first embodiment of the present disclosure, the symmetry is broken by having the dielectric grating receive the radiation at an off-normal angle of incidence. In a second embodiment of the present disclosure, the symmetry is broken by having an asymmetrical grating structure which receives the radiation at, for example, normal incidence.

Figure 1A:
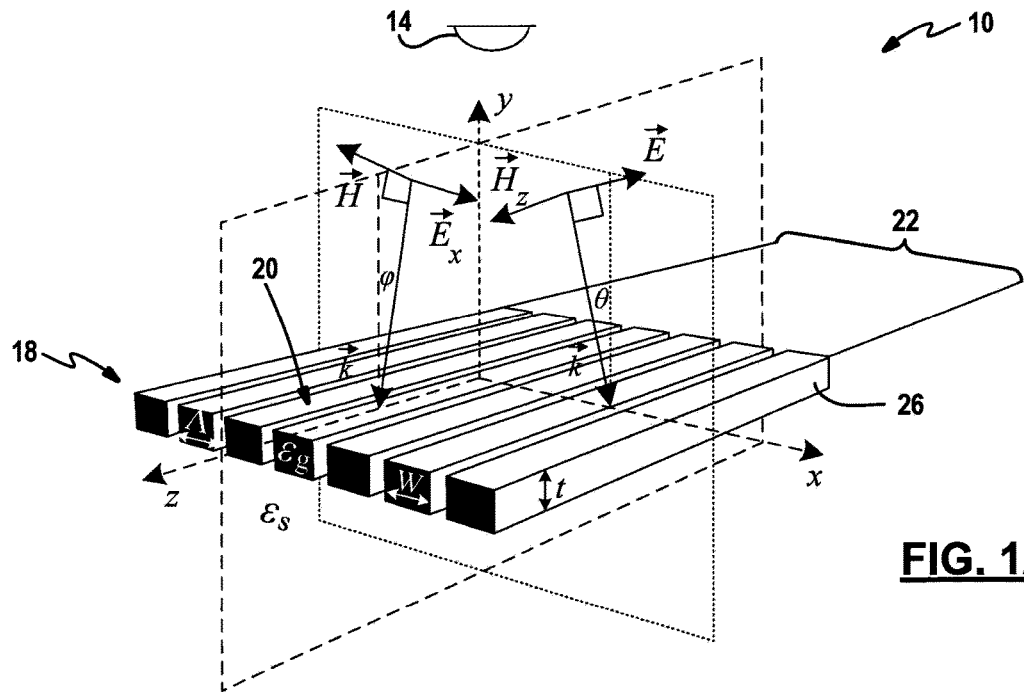
FIG. 1A is a schematic of a narrowband transmission system including a narrowband transmission filter having a dielectric grating in a first embodiment of the present disclosure.

FIG. 1A illustrates a narrowband transmission system 10 that includes a light source 14 and a narrowband transmission filter 18. The light source 14 emits radiation that is incident upon a surface 20 of the narrowband transmission filter 18. The narrowband transmission filter 18 includes a dielectric grating 22 that has multiple longitudinal members 26 arranged equidistant from each other. The dielectric grating 22 defines the surface 20 which extends along a plane parallel to a xz-plane.

In the example shown in FIG. 1A, the longitudinal members 26 are arranged along an x-axis (i.e., a first axis) and extend in parallel to each other and to a z-axis (i.e., a second axis). The grating 22 is defined by its relative permittivity ($\in_g$), a period ($\Theta$), a thickness (t), and a fill factor (FF). The fill factor is defined as the ratio of a grating width (w) to the grating period (w/Λ). A medium surrounding the longitudinal members 26 has a relative permittivity ($\in_s$) which is less than the relative permittivity of the grating (i.e., $\in_g > \in_s$). In other words, the index of refraction of the medium is less than the index of refraction of the material of the grating 22. The material of the longitudinal members 26 and the medium surrounding the grating 22 are assumed to be nonmagnetic ($\mu_g = \mu_s = 1$; "µ" is permeability). The present disclosure identifies properties related to the grating 22 with "g" and properties related to surrounding medium with "s". It should be readily understood that the dielectric grating may be surrounded by different media and is not limited to one type of medium. For example, one or more media may be disposed between the longitudinal members, above the dielectric grating (i.e, side of the grating that receives the radiation), and below the dielectric grating (i.e., a side opposite to the side that receives the radiation the second medium). Each medium has a relative permittivity which is less than the relative permittivity of the longitudinal members.

Figure 1B:
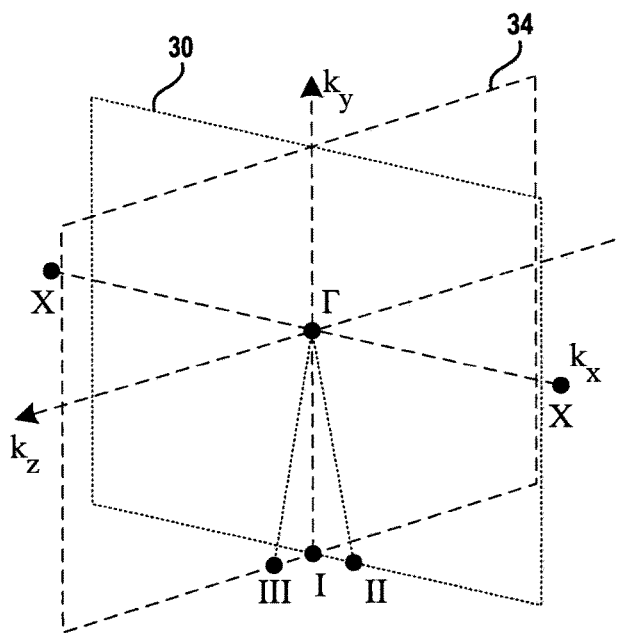
FIG. 1B illustrates a Brillouin zone of the dielectric grating with incident wave vectors for normal and off-normal incidence.

FIG. 1B illustrates the associated Brillouin zone of the dielectric grating 22. A plane wave with the electric field ($E_{xv}$) is perpendicular to the z-axis as indicated with dotted plane 30, and may be referred to as an electric field plane wave. A plane wave with the magnetic field ($H_{yz}$) is perpendicular to the x-axis as indicated with dotted plane 34, and may be referred to as magnetic field plane wave. The plane wave's angle of incidence is defined with respect to the normal as θ for the xy-plane 30 and as φ for the yz-plane 34 (see FIG. 1A). The grating's periodicity in the x-direction limits the extent of the first Brillouin zone in the $k_x$ direction while $k_y$ and $k_z$ remain unbounded. Note that $k_y$ may not be a good quantum number, as the system lacks translation symmetry in the y-direction. The far-field (plane-wave) wave vector of incident or radiated fields associated with the resonant modes may be defined by:

$$k_y^2 = w_{k_x k_z}^2/(c^2 - k_x^2 - k_z^2),$$

where c is the speed of light. In the example embodiment, the electric field travels along the x-axis and the magnetic field travels along the z-axis. Alternatively, the polarization may be switched such that the electric field travels along the z-axis and the magnetic field travels along the x-axis.

Analyzing the symmetry of the grating's supported modes and incident plane waves is used to leverage selective mode coupling to produce narrow-band transmission filters. With reference to FIG. 1B, mode coupling at normal incidence, which is indicated at Point I ($|k_y|>0$, $\theta=\varphi=0°$), and off-normal incidence in the xy-plane 30 and yz-plane 34 which are indicated at Point II ($|k_y|$, $|k_x|>0$, $\theta>0°$) and Point III ($|k_y|$, $|k_z|>0$, $\varphi>0°$), respectively, will be discussed in the following.

The grating 22 belongs to a $D_{2h}$ point group, requiring the grating's supported modes at a Γ point (k=0) to have the same symmetry as the point group's irreducible representations. Table I shows the character table of the $D_{2h}$, point group, along with some guided modes of the grating 22 that belong to each irreducible representation, which are illustrated and defined in FIGS. 2A, 2B, 3A, and 3B.

TABLE I

| $D_{2h}$ | E | $C_{2x}$ | $C_{2y}$ | $C_{2z}$ | i | $\sigma_z$ | $\sigma_y$ | $\sigma_x$ | TM Modes | TE Modes |
|---|---|---|---|---|---|---|---|---|---|---|
| $A_g$ | 1 | 1 | 1 | 1 | 1 | 1 | 1 | 1 | $TM_2^-$ | |
| $B_{1g}$ | 1 | 1 | -1 | -1 | 1 | 1 | -1 | -1 | $TM_1^+ TM_3^-$ | |
| $B_{2g}$ | 1 | -1 | 1 | -1 | 1 | -1 | 1 | -1 | | $TE_1^- TE_3^- TE_4^-$ |
| $B_{3g}$ | 1 | -1 | -1 | 1 | 1 | -1 | -1 | 1 | | $TE_2^+$ |
| $A_u$ | 1 | 1 | 1 | 1 | -1 | -1 | -1 | -1 | | $TE_2^-$ |
| $B_{1u}$ | 1 | 1 | -1 | -1 | -1 | -1 | 1 | 1 | | $TE_1^+$ |
| $B_{2u}$ | 1 | -1 | 1 | -1 | -1 | 1 | -1 | 1 | $TM_1^-$ | |
| $B_{3u}$ | 1 | -1 | -1 | 1 | -1 | 1 | 1 | -1 | $TM_2^+$ | |

Figure 2A:
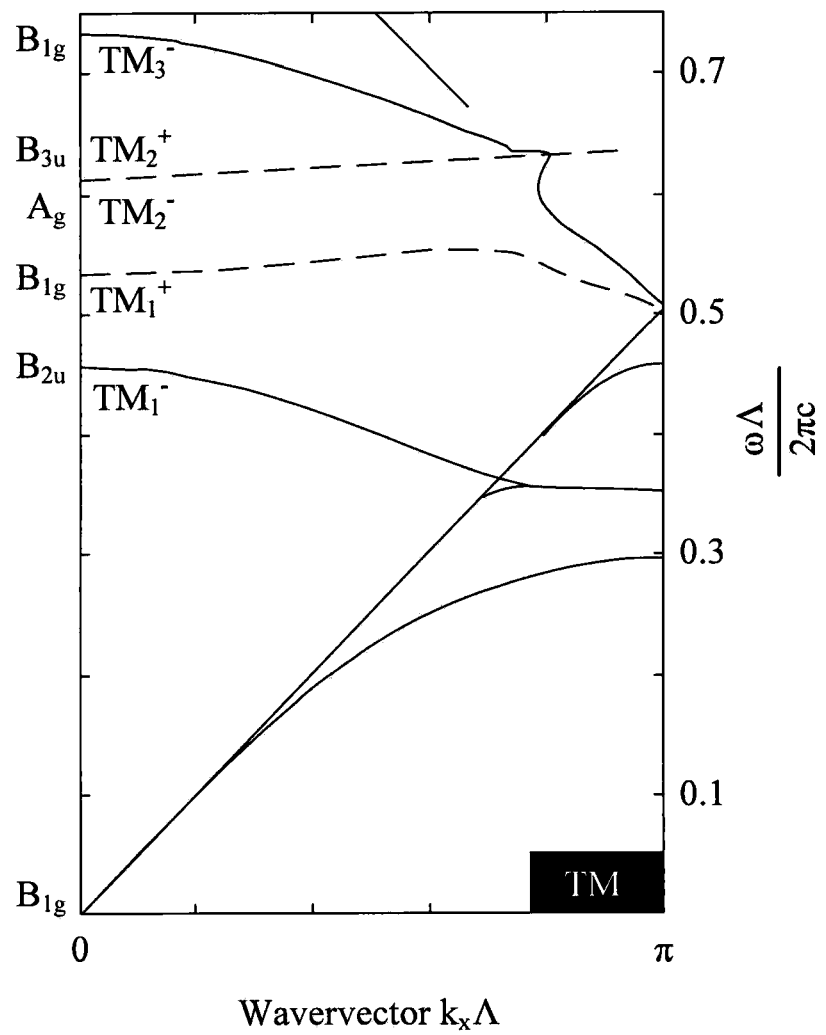
FIG. 2A is a graph of dispersion relations for even and odd transverse magnetic (TM) guided modes supported by the dielectric grating of FIG. 1A.
Figure 2B:
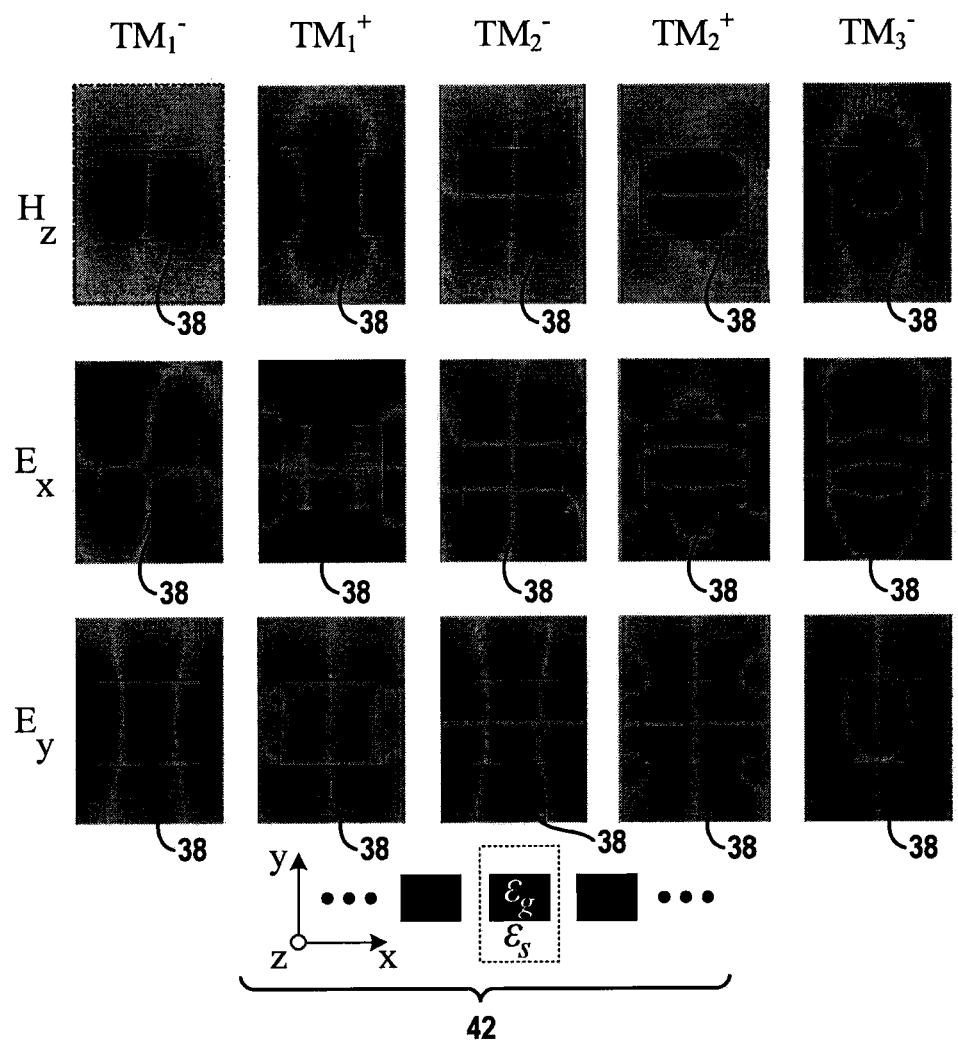
FIG. 2B illustrates electric and magnetic field profiles of the TM modes of FIG. 2A.

To facilitate a group theoretical analysis, the dispersion relations for the grating 22 was calculated using finite element methods. The modal analysis calculates the complex propagation constant using the weak formulation of Helmholtz equation expressed as a quadratic eigenvalue problem. FIGS. 2A and 2B illustrates the resulting dispersion relations for TM polarized modes and the associated field profiles for several resonances for a grating with:

$$\frac{t}{\Lambda} = 0.6$$

FF=0.72, $\epsilon_g$=11.7, and $\epsilon_s$=1. The dispersion relations include even bands (e.g., $TM_2$) and odd bands (e.g., $TM_1$ and $TM_3$).

The dispersion relations show the guided modes, with solid bands representing modes that were calculated using the modal analysis. The dashed bands, in contrast, were estimated from scattering analysis due to their imaginary propagation constants being larger than the Brillouin zone, which makes them difficult to accurately calculate. Because of the grating periodicity in one direction, the dispersion relations are represented in a reduced zone scheme with the index contrast between the grating and surrounding material lifting the degeneracies at the zone boundaries $$\left(k_x = \frac{\pi}{2}\right)$$

and zone center (k=0). The modes at zone center (k=0) are labeled with their irreducible representations, determined by using a reduction procedure and by applying the symmetry operations of the $D_{2h}$ point group to the simulated mode field profiles. These modes, with the exception of the zero-frequency mode, lie within the light cone as a consequence of the photonic crystal's slab design. Hence, phase matching is possible between these modes and incident light. The lowest-order leaky mode, $TM_1^-$, belongs to the $B_{2U}$ irreducible representation. This mode is antisymmetric upon rotation about the z axis ($C_{2z}$) and reflection across the xz plane ($\sigma_y$) and symmetric upon reflection across the yz plane ($\sigma_z$), remembering the magnetic field is a pseudovector. At normal incidence a TM polarized plane wave cannot excite modes of this symmetry.

A normally incident TM polarized plane wave, $|k_y|>0$, shown as Point I in FIG. 1B, belongs to the reduced symmetry of the $C_{2v}^y$ point group, where the superscript "y" indicates the symmetric rotation axis. With reference to Table II, shown below, the symmetry operations of this group (E, $C_{2y}$, $\sigma_z$, and $\sigma_y$) are summarized with its irreducible representations in section (a) of Table II, along with the grating modes belonging to each representation. A wave with this polarization can couple to TM (but not TE) guided modes in the grating. For this coupling to occur, the phase matching condition must be met and the overlap integral between the incident field and the supported mode must be nonzero; this requires the mode and incident wave to belong to the same irreducible representation.

TABLE II

| $C_{2y}$ | E | $C_{2y}$ | $\sigma_z$ | $\sigma_x$ | TM Modes | TE Modes | Point I | Γ |
|---|---|---|---|---|---|---|---|---|
| $A_1$ | 1 | 1 | 1 | 1 | $TM_1^-, TM_2^-$ |  | $A_1$ | $A_g, B_{2u}$ |
| $A_2$ | 1 | 1 | -1 | -1 |  | $TE_1^-, TE_2^-$ $TE_3^-, TE_4^-$ | $A_2$ | $B_{2g}, A_u$ |
| $B_1$ | 1 | -1 | 1 | -1 | $TM_1^+, TM_2^+$ $TM_3^-$ |  | $B_1$ | $B_{1g}, B_{3u}$ |
| $B_2$ | 1 | -1 | -1 | 1 |  | $TE_1^+, TE_2^+$ | $B_2$ | $B_{3g}, B_{1u}$ |
| (a) |  |  |  |  |  |  | (b) |  |

The compatibility relations between Point I and the Γ point, determined by comparing the character tables for the relevant symmetry operations, give their mutual irreducible representations. These relations, summarized in section (b) of Table II, show that each mode at Point I ($C_{2v}$ point group) maps onto two modes at the Γ point ($D_{2h}$ point group). The incident TM plane wave of Point I belongs to the $B_1$ irreducible representation, which matches the symmetry of the $B_{1g}$ and $B_{3u}$ Γ-point irreducible representations at Point I. This plane wave, thus, can couple to modes that belong to these two irreducible representations at the Γ-point while the other modes are inaccessible or symmetry protected. For example, section (a) of Table II shows that modes $TM_1^+$, $TM_2^+$, and $TM_3^-$ of FIG. 2A are all accessible at normal incidence, while modes $TM_1^-$ and $TM_2^-$ are symmetry protected. FIG. 2B illustrates the TM mode field profiles at $k_x=0$. A black line 38 at the center of each profile indicates the boundary between high and low permittivity regions, and a grating map 42 defines the direction (ie., x, y, z-axes) and the orientation of the longitudinal members of the grating. In FIG. 2B, the symmetry matching is illustrated by the x component of the electric field intensity where modes $TM_1^+$, $TM_2^+$, and $TM_3^-$ share plane-wave symmetry in the x direction while modes $TM_1^-$ and $TM_2^-$ are antisymmetric in the x direction.

To access the symmetry-protected modes, the incident wave vector can be moved off the $k_y$ axis to Point II, which is maintained in the $k_x k_y$ plane (FIG. 1B). Point II has the further reduced symmetry of the $C_s^{xy}$ point group, with symmetry only upon reflection across the xy plane, $\sigma_z$. The $C_s^{xy}$ character table and the modes associated with each irreducible representation, as well as the compatibility relations between Point II ($C_s^{xy}$ point group) and the Γ point ($D_{2h}$ point group) are given in Table III. As shown in section (a) of Table III, the reduced symmetry relaxes the selection rules which are illustrated by the mapping of four Γ-point irreducible representations onto each irreducible representation at Point II. An incident TM plane wave belongs to the A' irreducible representation. All the TM modes considered at Point II share this irreducible representation. Consequently, the modes that are symmetry protected at normal incidence can now couple to this off-normal incidence plane wave.

TABLE III

| $C_z^{xy}$ | E | $\sigma_z$ | TM Modes | TE Modes | Point I | Γ |
|---|---|---|---|---|---|---|
| A' | 1 | 1 | $TM_1^-$, $TM_1^+$ $TM_2^-$, $TM_2^+$, $TM_3^-$ | | A' | $A_g$, $B_{1g}$, $B_{2u}$, $B_{3u}$ |
| A" | 1 | −1 | | $TE_1^-$, $TE_1^+$, $TE_2^-$, $TE_2^+$, $TE_3^-$, $TE_4^-$ | A" | $A_u$, $B_{2g}$, $B_{3g}$, $B_{1u}$ |
| (a) | | | | | (b) | |

Figure 3A:
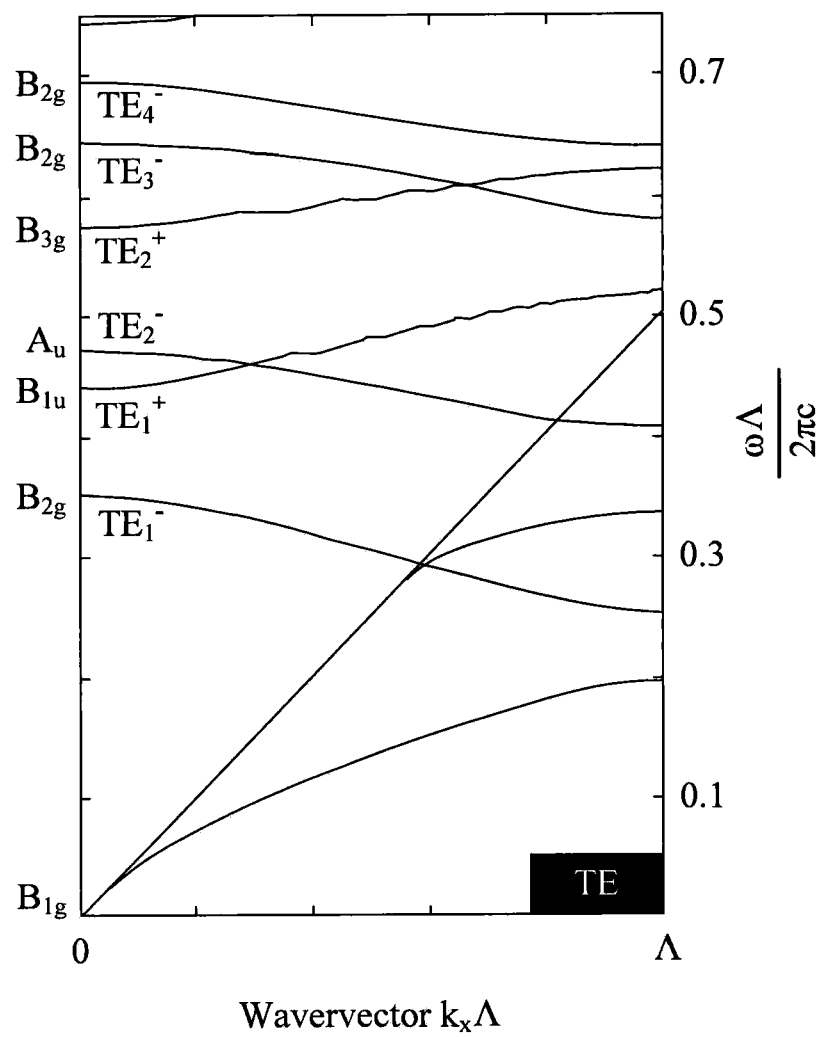
FIG. 3A is a graph of dispersion relations for even and odd transverse electric (TE) guided modes supported by the dielectric grating of FIG. 1A.
Figure 3B:
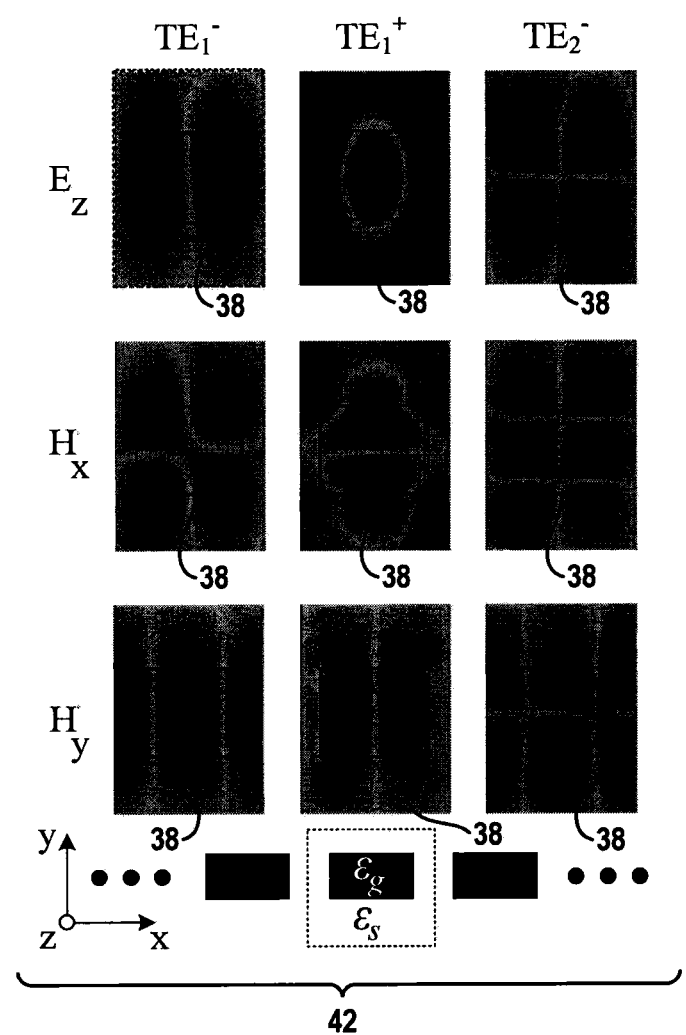
FIG. 3B illustrates electric and magnetic field profiles of the TE modes of FIG. 3A.

If a plane wave with wave vector at Point III of FIG. 1B is considered, symmetry is maintained across the yz plane, $\sigma_x$, and introduce a y-component of the magnetic field ($H_y$) to the plane wave. In addition to exciting TM modes, this wave can also couple to TE guided modes, provided they have the appropriate symmetry. FIG. 3A illustrates the TE dispersion relations for the grating defined in association with the FIG. 2A. The dispersion relations include even bands (e.g., $TE_2$, $TE_4$) and odd bands (e.g., $TE_1$ and $TE_3$). The TE dispersion relations were calculated using the modal analysis. FIG. 3B illustrates the TE mode field profiles at $k_1=0$.

With reference to Table IV, the $C_s^{yz}$ character table with modes associated with each irreducible representation is shown in section (a) of Table IV, and the compatibility relations between Point III ($C_s^{yz}$ point group) and the Γ point ($D_{2H}$ point group) is shown in section (b) of Table IV. At Point III the incident plane wave belongs to the A" irreducible representation of the $C_s^{yz}$ point group, which shares the symmetry of several guided modes at Point III, as shown in section (a) of Table IV. Thus, coupling to $TE_1^-$, $TE_2^-$, $TE_3^-$, and $TE_4^-$ is allowed while modes $TE_1^+$ and $TE_2^+$ remain symmetry protected due to their antisymmetry in $H_y$ across the yz plane. To couple to these additional modes, the x symmetry must also be broken, which could be achieved by introducing an additional $k_x$ component to the wave vector. A summary of the permissible mode coupling for incident plane waves with wave vectors at Points I, II, and III is given in Table V.

TABLE IV

| $C_z^{xy}$ | E | $\sigma_z$ | TM Modes | TE Modes | Point III | Γ |
|---|---|---|---|---|---|---|
| A' | 1 | 1 | $TM_2^-$, $TM_1^-$ | $TE_1^+$, $TE_2^+$ | A' | $A_g$, $B_{3g}$, $B_{1u}$, $B_{2u}$ |
| A" | 1 | −1 | $TM_1^+$, $TM_2^+$, $TM_3^-$ | $TE_1^-$, $TE_2^-$, $TE_3^-$ $TE_4^-$ | A" | $A_u$, $B_{1g}$, $B_{2g}$, $B_{3u}$ |
| (a) | | | | | (b) | |

TABLE V

| Modes | $TM_1^-$ | $TM_1^+$ | $TM_2^-$ | $TM_2^+$ | $TM_3^-$ | $TE_1^-$ | $TE_1^+$ | $TE_2^-$ | $TE_2^+$ | $TE_3^-$ | $TE_4^-$ |
|---|---|---|---|---|---|---|---|---|---|---|---|
| Point I | | X | | X | X | | | | | | |
| Point II | X | X | X | X | X | | | | | | |
| Point III | | X | | X | X | x | | x | | x | x |

Based on the selective mode coupling described above, the narrowband transmission system 10 having a dielectric grating, as a transmission filter, can be formed. The operating principle involves coupling the incident light to two grating modes that overlap in frequency and have different coupling strengths. The strongly coupled mode produces a broad reflectance resonance, and Fano interference with the weakly coupled mode produces a narrow transmission peak within this high reflectance background. Previous proposals achieved the overlapping strong and weak resonances by coupling modes of different diffractive orders, using asymmetric grating structures, or combining a grating with additional resonant structures. In contrast to these methods, the narrowband transmission filter described herein, the symmetry-protected modes of a single diffraction order are exploited to achieve the required coupling strength disparity.

Figure 4:
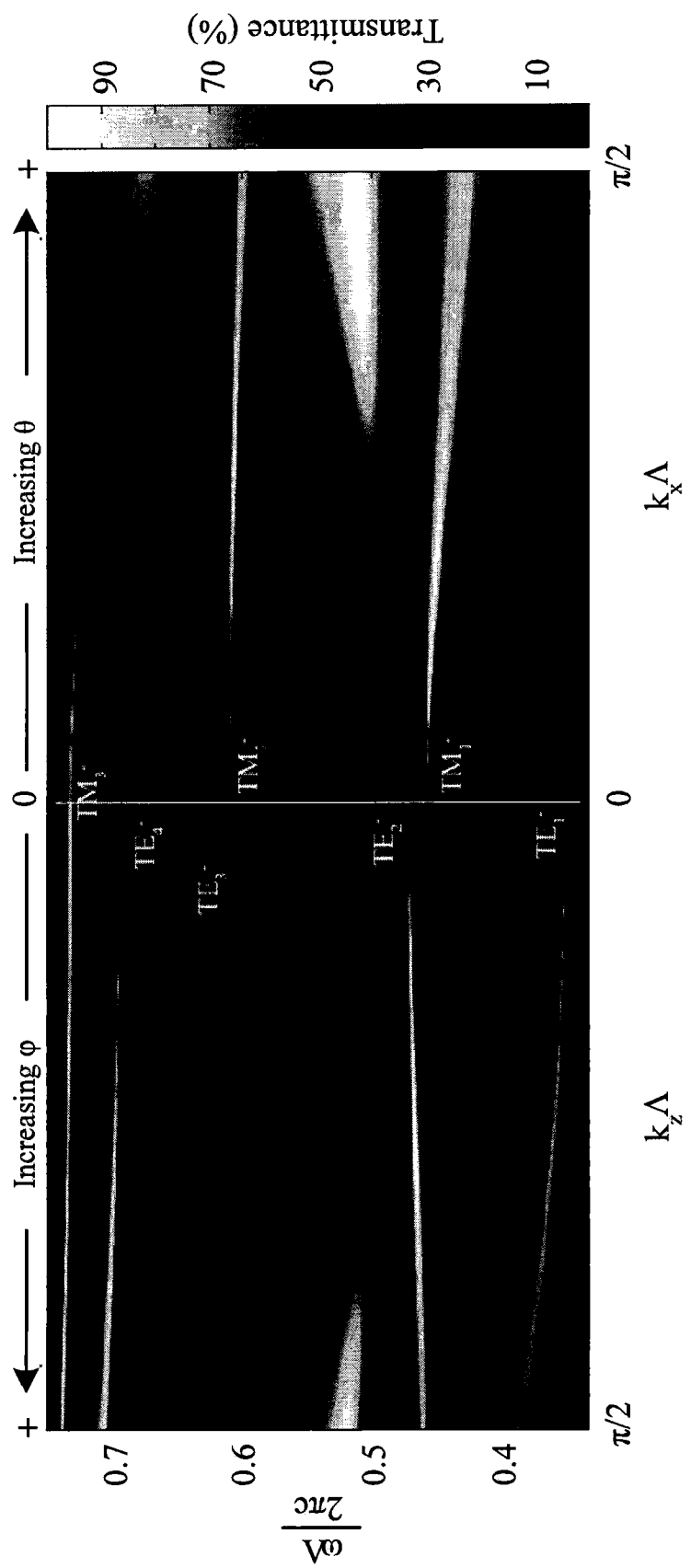
FIG. 4 is a graph of a transmittance profile of the dielectric grating at normal and off-normal incidence.

FIG. 4 shows a transmittance profile of the transmission filter in the $k_x$ and $k_y$ directions, or, in other words, moving towards Points II and III from Point I, respectively. The top scale shows increasing θ and φ direction corresponding to $|k_x|>0$ and $|k_z|>0$, respectively. Transmission bands are labeled with the mode associated with the resonance. The imaginary part of the propagation constant, determined from the modal analysis, represents the coupling strength to the radiation field. That is, a large value results in fast decay and consequently a broadband response, and a small value results in slow decay and consequently a narrowband response.

The width of a given resonance can be expressed by its quality factor $$\left(Q = \frac{\omega}{\Delta\omega}, \text{ where } \omega \text{ is the angular frequency}\right),$$

and is related to the energy decay within the mode given by:

$$U(t) = U(t_0)\exp\left[-\frac{w(t-t_0)}{Q}\right].$$

The dimensions of the grating are iteratively optimized to maximize the coupling strength to accessible TM modes at normal incidence (i.e., Point I) and consequently achieve a very low-Q response. The structure exhibits broadband reflectance greater than 95% for $$0.357 < \frac{\omega\Lambda}{2\pi c} < 0.625.$$

The optimized structure dimensions are identical to those used for the dispersion relations of FIGS. 2A and 3A:

$$\frac{t}{\Lambda} = 0.6$$

and FF=0.72.

Figure 5:
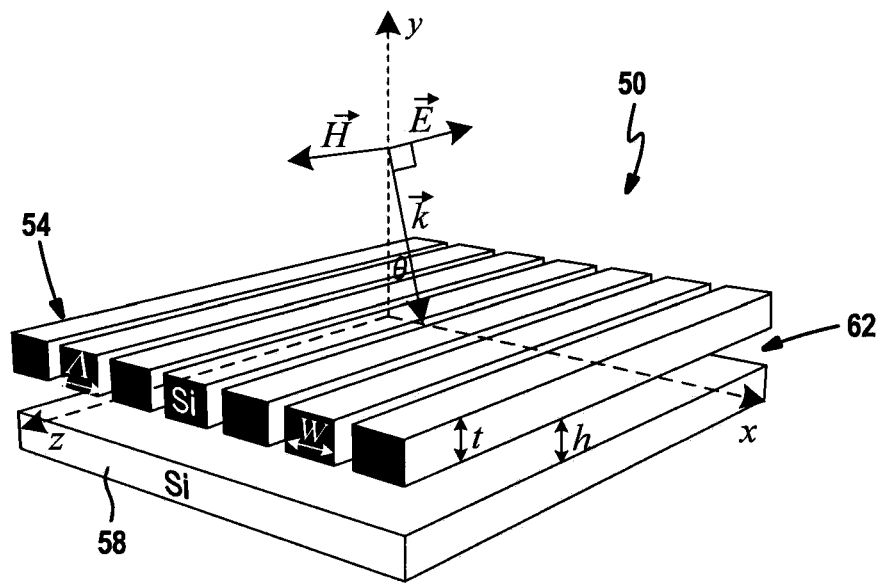
FIG. 5 is a schematic of a narrowband transmission filter having a dielectric grating and a substrate in a variation of the first embodiment.

The narrowband transmission filter may also include a substrate which defines a support surface. For example, FIG. 5 illustrates a transmission filter 50 having a dielectric grating 54 and a substrate 58. The substrate is disposed on a side of the dielectric grating 54 that is opposite to a side of the dielectric grating 54 that receives the radiation. The substrate 58 and the dielectric grating 54 are arranged such that a medium that has a relative permittivity lower than the relative permittivity of the grating 22 is disposed between the grating 22 and the substrate. For instance, The substrate 58 is separated from the grating 54 by an air layer 62.

The substrate 58 has a thickness of h/Λ, which is h/Λ=0.8 in the example embodiment. The substrate 58 is far enough to inhibit energy leakage from the grating 54. In the example, embodiment, the grating 54 and the substrate 58 are made of material having a permittivity of $\in_g$=11.7, which is consistent with silicon in the infrared regime. It is readily understood that the grating 54 and substrate 58 may be made of different materials and the grating 54 does not have to be of the same material as the substrate 58. More particularly, the grating 54 should be made of a material that has permittivity that is greater than a permittivity of the surrounding material.

At normal incidence the low-transmittance background is demonstrated as a result of the optimized coupling to the $TM_1^+$ and $TM_2^+$ modes. Based on the theoretical analysis, coupling to mode $TM_3^-$ is also expected. The transmission band associated with this mode exhibits a narrow-band response that is a result of a small overlap integral between the incident plane wave and mode. This small overlap integral can be inferred from the multiple nodes in the field profiles compared to an incident plane wave with wavelength greater than the grating thickness.

Away from normal incidence (i.e., $|k_x|>0$ or $|k_z|>0$), the relaxed selection rules enable coupling to the symmetry-protected modes. The broadband low transmittance is maintained near $k_x=k_z=0$ since the overlap integrals with the modes responsible for the response remain nearly constant, $\cos(\theta)\approx 1$. Within this broadband background, narrow transmission bands emerge as a result of weak coupling to the symmetry-protected modes. These transmission bands are labeled in FIG. 4 with the modes responsible for the resonant response. A perturbation to normal incidence will leave the mode profiles nearly identical to the zone center ($k_x=k_z=0$) modes, ensuring the overlap integral remains small and the associated coupling is weak. Thus, resonant high-Q transmission peaks are observed near normal incidence, and the peaks widen as $|k_x|$ or $|k_z|$ increases.

The overlap integrals for the two sets of modes, TM and TE, result from different mechanisms. For the TM cases, the off-normal incidence simply results in nonzero overlap integrals for every field component while the TE cases result from a small polarization overlap between the incident field and modes due to magnetic field depolarization when $k_z$ is introduced.

With continuing reference to FIG. 4, the agreement between the simulated transmittance and the modal analyses is strong. The transmittance bands for $|k_x|>0$ align with the dispersion relations of FIG. 2A, with deviations only observed for the estimated $TM_1^+$ and $TM_2^+$ bands. The transmittance bands associated with the TE modes are also in agreement with the zone center (k=0) frequencies of the TE dispersion relations. Furthermore, the $TM_3^-$ coupling responsible for the transmittance band at $\omega\Lambda/2\pi c=0.72$ persists as $|k_z|$ is increased, explicitly showing how the TM mode coupling is maintained while TE mode coupling is introduced.

An experimental demonstration was conducted using a suspended silicon grating fabricated from a silicon-on-insulator platform that operates in the long-wavelength infrared spectrum (LWIR, 8-14 μm). This spectral range has technological importance in thermal imaging, surveillance and remote sensing. The grating geometry was defined using standard photolithography and reactive ion etching, while subsequent hydrofluoric acid etching suspended the 250× 250 μm silicon grating slab. Scanning electron microscopy was used to optimize the structure fabrication. To characterize the structure's electromagnetic response, a commercial Fourier transform infrared (FTIR) spectrometer with a microscope attachment and a wire grid polarizer was used. The spectrometer resolution was 4 cm$^{-1}$. Additionally, a custom-made sample holder and an irs placed above the sample were used to constrain the light from the microscope's high numerical aperture (N.A.=0.6) Cassegrain objectives. The effective numerical aperture including the extra iris was approximately N.A.=0.05, corresponding to a spread in the incident angle of ±3°. The iris location was manipulated using an xyz-translation stage with micrometer adjustment, which enable independent control of $k_x$ and $k_z$ using the incident angles θ and φ defined in FIG. 1A.

Figure 6:
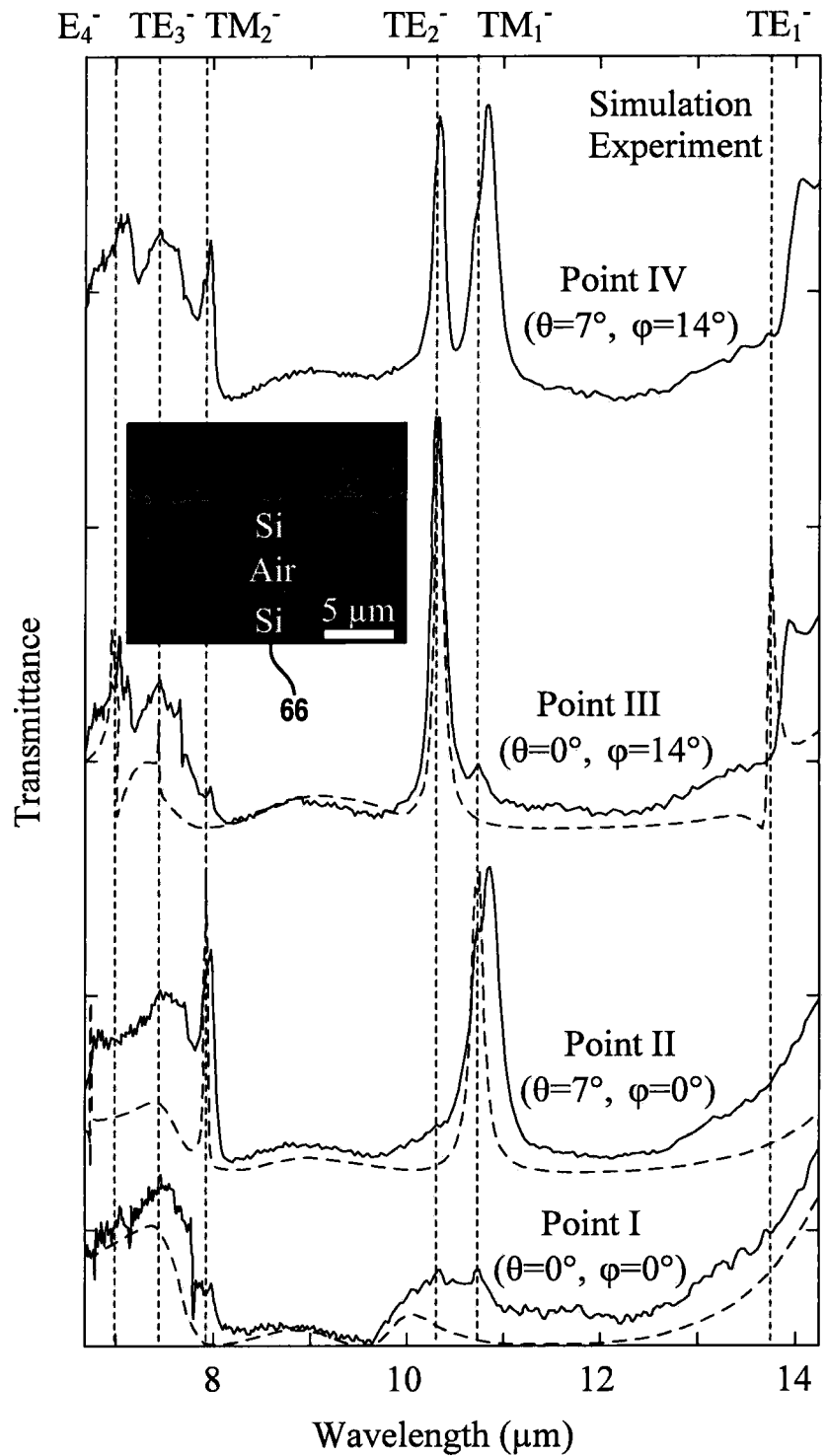
FIG. 6 is a graph of experimental and associated simulated transmittance of the narrowband transmission filter of the first embodiment.

FIG. 6 shows the experimental and simulated transmittance for a grating with dimensions Λ=4.9 μm, t=2.85 μm, h=4.05 μm and FF=0.72. The incident light configuration was set at Points I, II and III, as well as a fourth point (Point IV: θ, φ>0°). An inset 66 shows a scanning electron micrograph of a representative suspended grating. In contrast to the preceding analyses that defined the incident field using the wave vector, the experimental demonstration had the incident field defined by θ and φ. Accordingly, the plot labels of FIG. 6 do not represent a single point in k-space, but instead represent a range of incident wave vectors confined $k_xk_y$ and $k_yk_z$ planes for Points II and III, respectively.

In the absence of non-radiative losses, the quality factors of the peaks associated with the symmetry protected modes are expected to increase infinitely as the incident light approaches normal incidence. However, when the radiative coupling becomes less than the non-radiative losses, the peak height begins to decrease without appreciable further reductions in the peak width. The incidence angles reported in FIG. 6 are those for which the non-radiative and radiative losses are of the same order of magnitude, as discussed further below.

At normal incident (i.e., Point I: α=φ=0°), the low-transmittance background is demonstrated to be below 7% between 8 and 13 μm, which agrees with the simulated transmittance. The corresponding simulated response has been reduced to 70% of its calculated value to account for the reflection loss at the substrate's exit interface, which was not included in the simulation due to computational demands.

The experimental response at Point II (θ=7°, φ=0°) is similarly shown to agree with the simulation. In this case, the transmittance has been normalized to the peak transmittance of the experimental results (26%) to accentuate the qualitative agreement between the data sets. The experimental response exhibits the transmission bands associated with both the $TM_1^-$ and $TM_2^-$ with moderate broadening and wavelength shifts compared to the simulation that will be explained below.

Point III (θ=0°, φ=14°) demonstrates selective coupling to TE modes. Modes $TE_1^-$ and $TE_2^-$ are clearly demonstrated and signatures of modes $TE_3^-$ and $TM_4^-$ are observable with the normalized simulated response (36.5%) agreeing with the data. For both TM and TE demonstrations, the transmission band frequencies are within 1% of those determined from the modal analysis, which is within the experimental error of measuring the gratings dimensions. To ensure the resonant response results from two separate mode sets, data was taken at Point IV (θ=7°, μ=14°)), which introduces $k_x$ and $k_z$ simultaneously. The corresponding data exhibit transmission bands associated with both TM and TE mode sets, confirming the independence of the mode coupling at Points II and III. At the further reduced symmetry of Point IV, resonant transmission bands from modes $TE_1^+$ and $TE_2^+$ were expected. Unfortunately, due to the small overlap integrals in both the $k_x$ and $k_y$ directions, the resulting quality factors were too high to be resolved experimentally.

Selective coupling to symmetry-protected modes of the dielectric grating is utilized to realize a transmission filter. Per the theoretical analysis describe herein, a series of selection rules that govern plane wave coupling to the grating's supported modes are defined. Using these selection rules, the coupling strength to modes accessible at normal incidence to provide a low-transmittance background is maximized. By introducing a perturbation to normal incidence in the $k_x$ (θ>0°) or $k_z$ (φ>0°) directions, weak coupling to TM and TE symmetry protected modes, respectively, was shown to result in high-Q transmission peaks within the low-transmittance background. Both simulated and experimental results verified the grating's transmission filtering capabilities at various incidence angles, which were shown to agree with each other and the modal analysis.

Figure 7A:
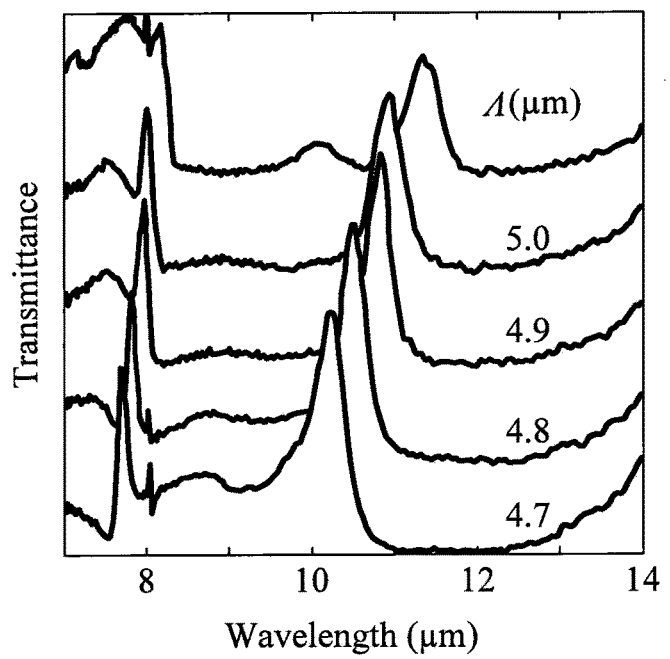
FIGS. 7A and 7B are graphs of experimental and simulated transmittance of suspended silicon gratings of varying periods.
Figure 7B:
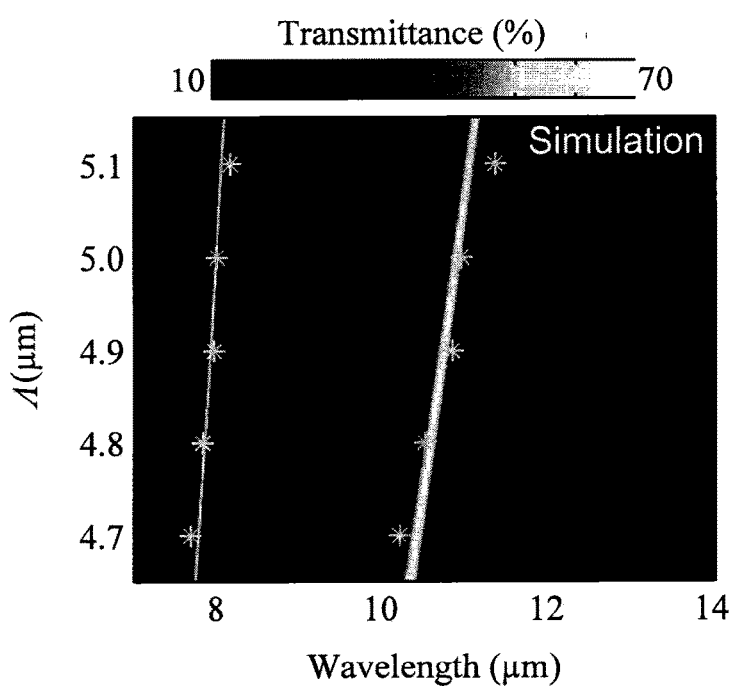

The filtered wavelength can also be selected by varying the geometry of the grating 22 of FIG. 1 or the grating 54 of FIG. 5. To illustrate the ease with which a given wavelength band can be selected, a series of gratings are characterized with periods between 4.7 μm and 5.1 μm while the grating thickness and fill factor are constant. With reference to FIGS. 7A and 7B, the experimental transmittance exhibits strong filtering capacity, marked by strong discrimination from background and narrow pass-bands. A contour plot of the simulated transmittance includes the experimental peak wavelength for each period overlaid (designated (*)), illustrating the strong agreement between datasets.

The narrowband transmission filters described herein have potential to be used in a wide array of applications. While the experimental demonstration was performed in the LWIR, the operating principle is scalable to any wavelength range, if similarly lossless materials are available. In the LWIR, these filters may enable improved hyperspectral imaging capabilities for remote sensing and surveillance applications. Hyperspectral imaging records the electromagnetic spectrum for every point in a viewing plane, providing enhanced discrimination between objects. The single-layer narrowband transmission filters have potential to be integrated at the pixel or subpixel level, which may lead to improved and more cost-effective imaging capabilities. Additionally, selective emitters/absorbers are expected to increase the efficiency of thermophotovoltaics. These gratings may enhance selective emitting/absorbing capabilities for these applications over similar two-dimensional structures by exploiting the higher density of states afforded by one-dimensional structures.

The narrowband transmission system 10 of the first embodiment operates through Fano interference of two leaky guided modes at off-normal incidence. In the narrowband transmission system 10, a set of strongly coupled modes produce a broadband opaque background at normal incidence. Introducing off-normal incidence permits coupling to modes that are symmetry protected at normal incidence. This small perturbation results in weak coupling with a corresponding narrowband response within the opaque background. Unfortunately for many applications, including integrated silicon photonics, normal incidence excitation is required. Thus, instead of breaking the symmetry of the incident light, a narrowband transmission filter in a second embodiment breaks the symmetry of the grating elements to achieve normal incidence narrowband transmission filtering capabilities. For example, the period and fill factor can be changed across the grating or, alternatively, the longitudinal members of the grating may be etched at an angle to break the symmetry across the yz plane, $\sigma_x$.

Figure 8:
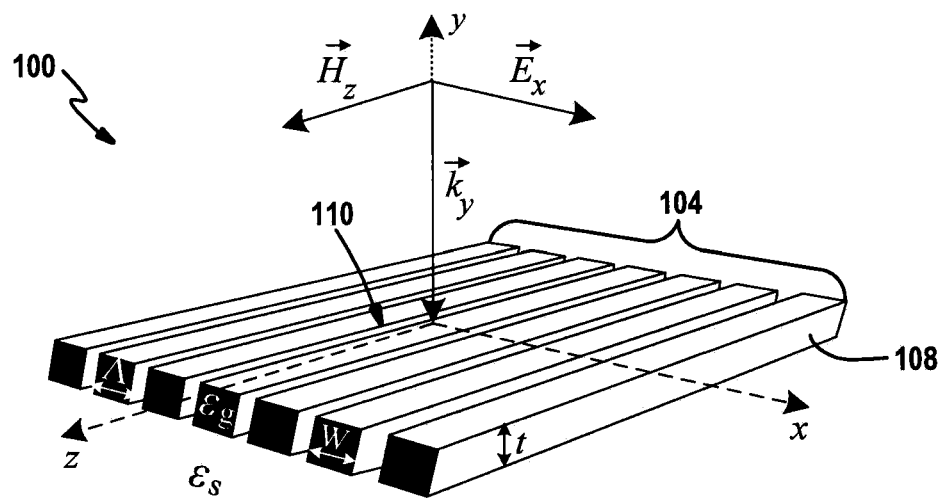
FIG. 8 is a schematic of a narrowband transmission filter including a dielectric grating in a second embodiment of the present disclosure.

FIG. 8 illustrates a narrowband transmission filter 100 that includes a dielectric grating 104. The dielectric grating 104 includes multiple longitudinal members 108 that are arranged along the x-axis and are parallel to each other. The dielectric grating 104 defines a surface 110 that extends along a plane parallel to the xz-plane. The narrowband transmission filter 100 receives radiation from a light source (not shown) such that the radiation is incident upon the surface 110 at normal incidence. The grating 104 is periodic in the x-direction. A medium surrounding the grating 104 has a relative permittivity ($\in_s$) which is less than the relative permittivity of the grating (i.e., $\in_g > \in_s$). The narrowband transmission filter 100 is invariant in the z-direction. The dimensions of the grating 104 include a period (Λ), height (t), and duty cycle or fill factor, which is defined as the ratio of the high permittivity region to the grating period (w/Λ, where "w" is the width of the high permittivity region $\in_g$).

In the following description, TM polarization, which is defined with the magnetic field directed in the z-direction, is used, however TE polarization with the electric field directed in the z-direction could similarly be used. This polarization permits coupling between the incident light and TM modes supported by the grating 104. The field is incident from the +y direction. More particularly, per the second embodiment, the radiation is received at a surface of the grating 104 at normal incidence and the symmetry of the grating is broken in the xy-plane in order to couple to the same modes described above with regard to the first embodiment. Thus, the grating 104 is able to obtain normal incidence narrowband transmission filtering capabilities.

Figure 9:
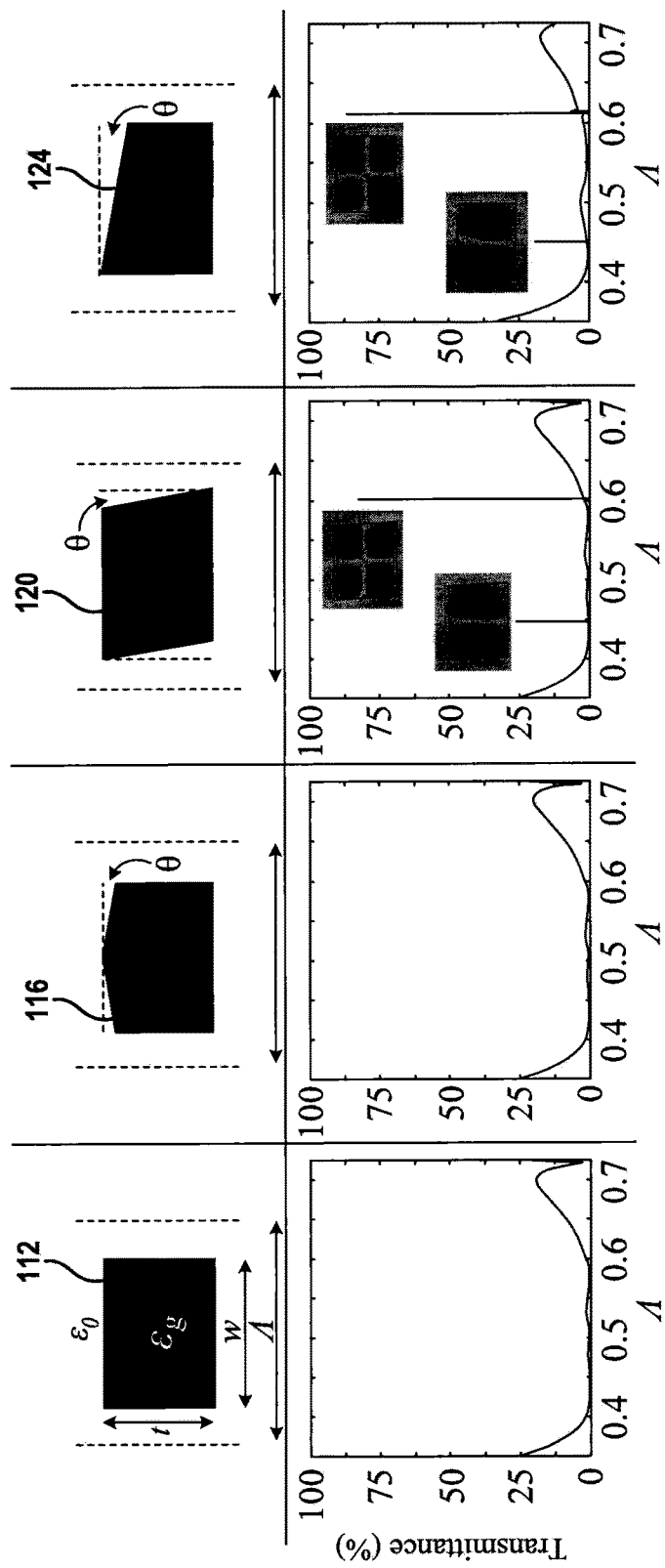
FIG. 9 illustrates four cross-sectional structures of the dielectric grating and corresponding transmission graphs of the structures as illustrative examples of the second embodiment.

By way of example, FIG. 9 illustrates four cross-sectional structures representative of a cross-section of a given longitudinal member of a dielectric grating along an axis parallel with width of the longitudinal member. Each of the four cross-section structures are associated with respective transmittance graph. The four geometries include a rectangle 112, a pentagon 116, a rhomboid 120, and a right trapezoid 124. The rectangle 112 correlates with the structure of the longitudinal member for a broadband reflector or, in other words, for the dielectric grating of the first embodiment. The pentagon 116, the rhomboid 120 and the right trapezoid 124 each have perturbation to the rectangle 112.

By basing the design of structures 116, 120, and 124 on the rectangular geometry, the narrowband transmission filter 100 maintains strong coupling to the modes responsible for establishing the opaque background, while introducing a small angle θ to one or more of the rectangle's sides to reduce the structure's symmetry compared to the rectangular cross-section. This reduction in symmetry can be exploited to permit coupling between incident plane waves and supported guided modes of the structure.

FIG. 9 illustrates the normal incidence responses of each structure when an angle of θ=3° is introduced (θ is etch angle or perturbation angle). The dimensions of the rectangular 112 is t/Λ=0.6, ω/Λ=0.75, and $\in_{g/\in_{air}} \approx 3.4$. For computational analyses, the grating's index of refraction was assumed to be equivalent to that of silicon from literature, which was chosen to facilitate prospective experimental demonstration.

The rectangular structure 112 and the pentagon structure 116 exhibit broadband reflectance at normal incidence, while the rhomboid structure 120 and the right trapezoid structure 124 exhibit narrow transmission bands. The corresponding magnetic field profiles, $H_z$ for each transmission band show the supported mode profiles associated with the transmission filtering capabilities. These two modes, designated $TM_1$ and $TM_2$ for the lower and higher frequency bands, respectively, are equivalent to those described above for the rectangular geometry at off-normal incidence in the first embodiment. These transmission bands are a consequence of breaking the grating's symmetry, which allows weak coupling to the symmetry protected modes shown.

Figure 10:
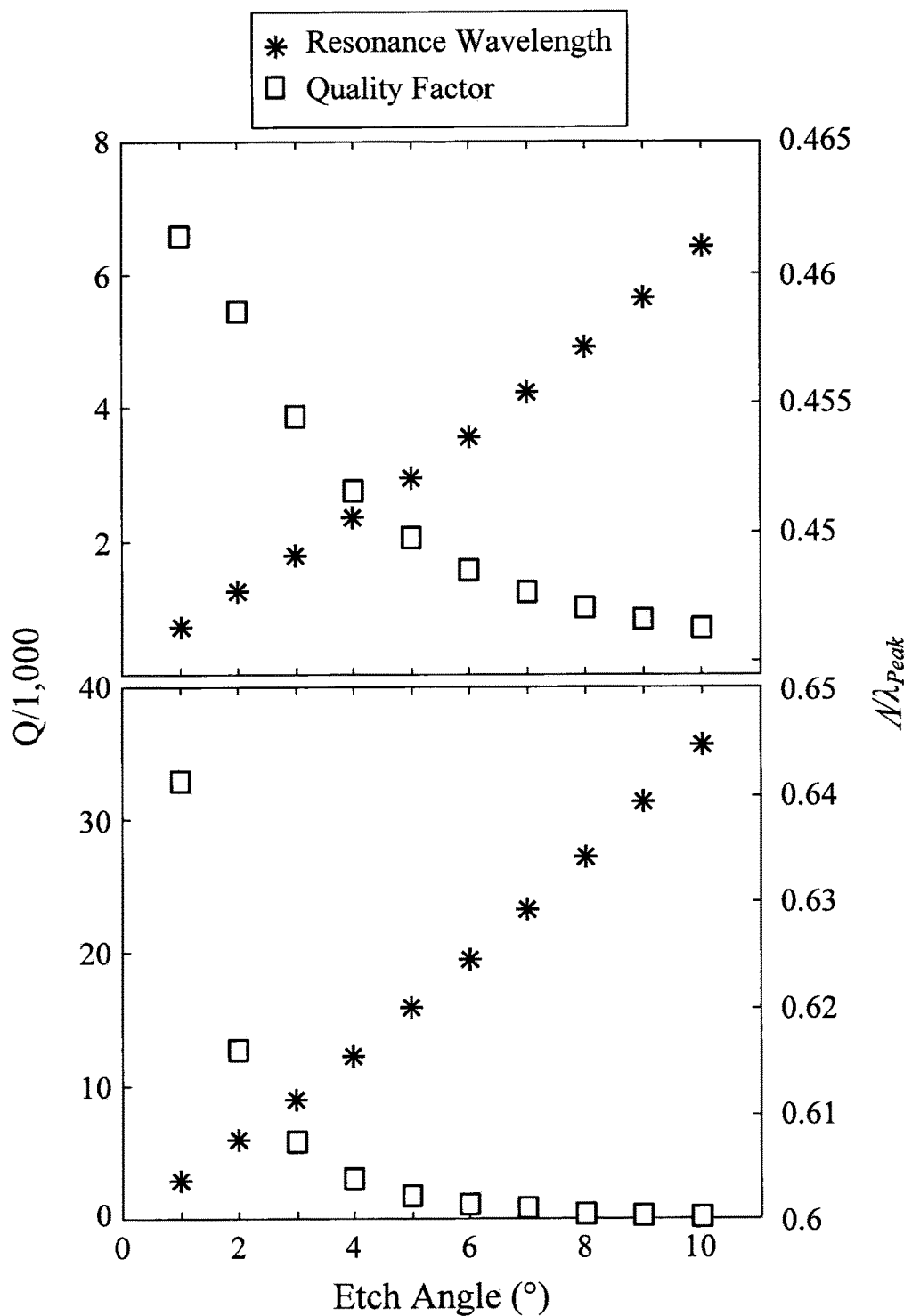
FIG. 10 is a graph of quality factors and normalized filtered wavelengths for a right trapezoid structure of FIG. 9 as an etching angle of the right trapezoid structure is increased.

To characterize the operational performance of the narrowband transmission filters, the etching angle θ is varied from θ=1° to θ=10° and the quality factor (Q, as defined in the first embodiment) and filtered wavelength are analyzed. FIG. 10 illustrates the resulting quality factors and normalized filtered wavelengths ($\Lambda/\lambda_{peak}$) for the right trapezoid structure 124 of FIG. 9. Although not illustrated, a similar response is exhibited by the rhomboid structure 120. The response shown in FIG. 10 is similar to the operation of the rectangular structure when the incident angle is increased. Because the transmission band is a consequence of a symmetry protected mode, when a small perturbation to the geometry is introduced, weak coupling is permitted, and the response is narrowband. As the etch angle is increased, the symmetry protection is removed, increasing the overlap integral between the plane wave and supported mode, and resulting in bandwidth broadening.

Also evident in FIG. 10 are red-shifts in the filtered wavelength as the etch angle is increased. The filtered wavelength is related to the dispersion relations of the grating structure, and as a consequence the shift in wavelength indicates a change in the dispersion relations for the grating as the incident angle is increased.

To understand the symmetry considerations that lead to the transmission filtering capabilities, the geometries and incident fields are analyzed using group theory. This analysis will elucidate the selection rules for each of the geometries, relying on the assumption that the supported modes of a structure belong to the irreducible representations of the structure's point group. Furthermore, an incident plane wave can only couple to a supported mode if it possesses the same symmetry as the supported mode.

As discussed previously, the rectangular geometry belongs to the $D_{2h}$ symmetry at the Γ-point and the $C_{2v}^y$, at normal incidence. The supported modes belong to the $A_1$ irreducible representation within this reduced symmetry. A plane wave, in contrast, belongs to the $B_1$ irreducible representation and thus cannot couple to the supported modes of the grating responsible for the transmission filtering capabilities. Breaking the symmetry, by moving off normal incidence, was previously used to enable weak coupling to these modes.

The pentagonal cross-sectional grating belongs to the reduced symmetry of $C_{2v}^y$ at the Γ-point due to its asymmetry upon reflection in the ŷ-direction, $\sigma_y$. The superscript "y" indicates the axes about which there is rotational symmetry. Unlike the rectangular cross-section, introducing an incident plane wave does not reduce the symmetry further since the y-direction symmetry has already been broken by the geometry of the grating. Thus the structure belongs to the same symmetry, $C_{2v}^y$ which is identical to that of the rectangle at normal incidence. Consequently, the supported modes similarly belong to the $A_1$ irreducible representation, which is different from that of a plane wave, $B_1$. Thus, this structure similarly prohibits coupling to the symmetry protected modes at normal incidence, yielding the broadband opaque background.

In contrast to the previous two structures, the rhomboidal cross-section is symmetric upon rotation by 180° about the z-axis, $C_2^z$, reflection in the ẑ-direction ($\sigma_z$), and it possesses inversion symmetry (i). Consequently, at the Γ-point, this structure belongs to the $C_{2h}^z$ point group, where the superscript "z" indicates the axis about which the structure possesses rotational symmetry. At normal incidence, the rotational and inversion symmetries are no longer applicable, resulting in a reduced symmetry for the system. Hence, the structure belongs to the $C_s^z$ point group, where the superscript "z" indicates the direction of reflection symmetry. The supported modes in this point group, both belong to the A' symmetry. An incident plane wave shares this symmetry since the only requirement is a reflection in the ẑ-direction. As a consequence, a plane wave can couple to the two supported modes that have been symmetry protected for the other two geometries. Furthermore, because the angle introduced from vertical is small, the coupling is weak, and the resulting transmission bands are narrow.

Finally, the right trapezoidal geometry only possesses reflection symmetry in the z-direction, which is maintained with normal incidence light. The structure belongs to the $C_s^z$ point group leading to the same analysis as the rhomboidal cross-section above. This structure similarly allows coupling between a normally incident plane wave and the supported modes responsible for the transmission filtering capabilities. Table VI summarizes the above group theoretical analysis and labels the structures that allow coupling to symmetry protected modes.

TABLE VI

|  | Rectangle | | Pentagon | | Rhomboid | | Right Trapezoid | |
| --- | --- | --- | --- | --- | --- | --- | --- | --- |
| Γ-Point Group | $D_{2h}$ | | $C_{2v}^y$ | | $C_{2h}^z$ | | $C_s^z$ | |
| Normal Incidence Point Group | $C_{2v}^y$ | | $C_{2v}^y$ | | $C_s^z$ | | $C_s^z$ | |
| Guided Mode | $TM_1$ | $TM_2$ | $TM_1$ | $TM_2$ | $TM_1$ | $TM_2$ | $TM_1$ | $TM_2$ |
| Mode Irreducible Representation | $A_1$ | $A_1$ | $A_1$ | $A_1$ | A' | A' | A' | A' |
| Plane Wave Irreducible Representation | $B_1$ | $B_1$ | $B_1$ | $B_1$ | A' | A' | A' | A' |
| Symmetry Protected | Y | Y | Y | Y | N | N | N | N |
| Normal Incidence Filter | N | N | N | N | Y | Y | Y | Y |

The right trapezoidal geometry is a mild variation of blazed gratings, which are routinely fabricated. Gray-scale lithography offers one method that may be used to realize this geometry. The rhomboid may be even simpler to fabricate by simply tilting the sample during reactive ion-etching to achieve the angle required to break the symmetry.

The second embodiment discloses breaking the symmetry of the dielectric grating in order to couple to modes that are symmetry protected at normal incidence. As described above, each of the longitudinal members of the grating may have an asymmetrical cross-section to form the asymmetric grating. Alternatively, the symmetry of the dielectric grating may be broken by varying any one of the grating period, the fill factor, or dimensions of the longitudinal members (e.g., the height, the width, the thickness). While the second embodiment discloses having the grating receive the radiation at normal incidence, the radiation may also be received at a non-zero angle of incidence. That is, the symmetry between the radiation and the dielectric grating is broken by the asymmetric dielectric grating. By having the dielectric grating receive radiation at non-zero angle of incidence, the coupling strength to the modes responsible for transmission filtering increases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features elements, and/or components, but do not preclude the presence or addition of one or more other features, elements, components, and/or groups thereof.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A narrowband transmission system comprising:
a dielectric grating defining a receiving surface configured to receive radiation incident thereon and an emitting surface opposing the receiving surface, the dielectric grating including a plurality of longitudinal members, the plurality of longitudinal members being arranged along an axis and being surrounded by a medium, wherein the plurality of longitudinal members are made of a material that has an index of refraction that is greater than an index of refraction of the medium, and wherein spacing and cross-section of the plurality of longitudinal members are arranged to reject transmission through the dielectric grating of radiation normally incident thereon over a given wavelength band; and
means for breaking a symmetry between the radiation and the dielectric grating such that the emitting surface of the dielectric grating transmits radiation in a passband while continuing to reject remainder of wavelengths in the given wavelength band, where width of the passband is less than width of the given wavelength band and the passband lies within the given wavelength band.

2. The narrowband transmission system of claim 1 wherein the means for breaking the symmetry includes the dielectric grating receiving the radiation at a non-zero angle of incidence.

3. The narrowband transmission system of claim 1 wherein the means for breaking the symmetry includes having an asymmetrical dielectric grating as the dielectric grating.

4. The narrowband transmission system of claim 1 wherein dimensions of the dielectric grating is optimized such that the dielectric grating is configured as a broadband reflector when the dielectric grating receives the radiation at normal incidence.

5. A narrowband transmission system comprising:
a dielectric grating defining a receiving surface configured to receive radiation incident thereon and an emitting surface opposing the receiving surface and including a plurality of longitudinal members, the plurality of longitudinal members being arranged equidistant from each other as defined by a grating period and being surrounded by a medium, wherein
the plurality of longitudinal members are made of a material that has an index of refraction that is greater than an index of refraction of the medium,
wherein spacing and cross-section of the plurality of longitudinal members are arranged to reject transmission through the dielectric grating of radiation normally incident thereon over a given wavelength band; and
the dielectric grating is arranged such that the receiving surface receives radiation at a non-zero angle of incidence such that the dielectric grating transmits a passband of the radiation through the dielectric grating while rejecting remainder of wavelengths embodied in the given wavelength band, where width of the passband is less than width of the given wavelength band, the passband lies within the given wavelength band, and the passband falls in between wavelengths in the remainder of the wavelengths.

6. The narrowband transmission system of claim 5 further comprising:
a substrate defining a support surface and an opposing output surface, wherein the substrate is disposed on a side of the dielectric grating that is opposite to the surface receiving the radiation, a second medium is interposed between the dielectric grating and the support surface of the substrate, and the material of the plurality of longitudinal members of the dielectric grating has the index of refraction that is greater than an index of refraction of the second medium.

7. The narrowband transmission system of claim 5 wherein:
the plurality of longitudinal members are arranged equidistant from each other along a first axis and extend parallel to each other and to a second axis, the second axis is perpendicular to the first axis, and
the non-zero angle of incidence is measured from a normal axis that is normal to the surface plane towards the first axis such that one of an electric field and a magnetic field of the radiation propagates along a plane defined by the normal axis and the first axis and the other one of the electric field and the magnetic field of the radiation propagates along the second axis, the normal axis is perpendicular to the first axis and the second axis.

8. The narrowband transmission system of claim 5 wherein the radiation is received at an angle of incidence greater than zero and less than or equal to 15 degrees with respect to a normal of the surface plane of the dielectric grating.

9. The narrowband transmission system of claim 5 wherein:
the plurality of longitudinal members are arranged equidistant from each other as defined by a grating period, each of the plurality of longitudinal members are defined by a height, a width, and a thickness, and
the given wavelength band of the radiation transmitted is selected based on at least one of the height, the width, the thickness, the grating period, and the non-zero angle of incidence of the radiation that is incident upon the narrowband transmission filter.

10. The narrowband transmission system of claim 5 wherein the plurality of longitudinal members are arranged equidistant from each other as defined by a grating period, and the plurality of longitudinal members have same height, width, and thickness as each other.

11. The narrowband transmission system of claim 5 further comprising:
a light source emitting the radiation, wherein the dielectric grating and the light source are arranged such that the surface plane of the dielectric grating receives the radiation at the non-zero angle of incidence.

12. The narrowband transmission system of claim 5 wherein dimensions of the dielectric grating is optimized such that the dielectric grating is configured as a broadband reflector when the dielectric grating receives the radiation at normal incidence.

13. A narrowband transmission filter comprising:
a dielectric grating defining a receiving surface configured to receive radiation incident thereon and an emitting surface opposing the receiving surface and having an asymmetrical cross-section, the dielectric grating including a plurality of longitudinal members, the plurality of longitudinal members being surrounded by a medium, wherein
the plurality of longitudinal members are made of a material that has an index of refraction that is greater than an index of refraction of the medium,
the plurality of longitudinal members are arranged along a first axis and extend parallel to each other and to a second axis, the second axis is perpendicular to the first axis,
wherein spacing and cross-section of the plurality of longitudinal members are arranged to reject transmission through the dielectric grating of radiation normally incident thereon over a given wavelength band and the dielectric grating is arranged such that the receiving surface receives radiation at non-zero angle of incidence, and the dielectric grating is operable to transmit radiation in a passband from the emitting surface while rejecting remainder of wavelengths embodied in the given wavelength band, where width of the passband is less than width of the given wavelength band, the passband lies within the given wavelength band, and the passband falls in between wavelengths in the remainder of the wavelengths.

14. The narrowband transmission filter of claim 13 each of the plurality of longitudinal members of the dielectric grating are asymmetrical about a predefined plane defined by the second axis and a normal axis, the normal axis is normal to the surface and perpendicular to the first axis to the second axis, and the plurality of longitudinal members define the asymmetrical cross-section of the dielectric grating.

15. The narrowband transmission filter of claim 13 wherein each of the plurality of longitudinal members of the dielectric grating are asymmetrical about a plane defined by the first axis and a normal axis, the normal axis is normal to the surface and perpendicular to the first axis to the second axis, and the plurality of longitudinal members define the asymmetrical cross-section of the dielectric grating.

16. The narrowband transmission filter of claim 13 wherein each of the plurality of longitudinal members of the dielectric grating is asymmetrical about a predefined plane by a perturbation angle measured from the predefined plane to an etch surface of the longitudinal member, the plurality of longitudinal members define the asymmetrical cross-section of the dielectric grating, and the given wavelength band of the radiation transmitted is selected based on the perturbation angle.

17. The narrowband transmission filter of claim 13 wherein the dielectric grating is asymmetrical about a predefined plane defined by the second axis and a normal axis, the normal axis is normal to the surface and perpendicular to the first axis to the second axis.

18. The narrowband transmission filter of claim 13 wherein the angle of incidence is equal to a normal to the surface.

19. The narrowband transmission filter of claim 13 wherein:
each of the plurality of longitudinal members are defined by a height, a width, and a thickness, and
the given wavelength band of the radiation transmitted is selected based on at least one of the height, the width, the thickness, the grating period, and the non-zero angle of incidence of the radiation that is incident upon the narrowband transmission filter.

20. The narrowband transmission filter of claim 13 wherein each of the plurality of longitudinal members of the dielectric grating have a right trapezoid-shaped cross-section.

21. The narrowband transmission filter of claim 13 wherein each of the plurality of longitudinal members of the dielectric grating have a rhomboid-shaped cross-section.

22. A narrowband transmission system comprising:
a dielectric grating defining a receiving surface and configured to receive radiation incident thereon and an emitting surface opposing the receiving surface, the dielectric grating including a plurality of longitudinal members, the plurality of longitudinal members being arranged along an axis and being surrounded by a medium, wherein the plurality of longitudinal members are made of a material that has an index of refraction that is greater than an index of refraction of the medium, and wherein spacing and cross-section of the plurality of longitudinal members are arranged to reject transmission through the dielectric grating of radiation normally incident thereon over a given wavelength band; and means for breaking a symmetry between the radiation and the dielectric grating such that the emitting surface of the dielectric grating transmits radiation in a passband while continuing to reject remainder of wavelengths in the given wavelength band, where width of the passband is less than width of the given wavelength band, the passband lies within the given wavelength band, and the passband falls in between wavelengths in the remainder of the wavelengths.

* * * * *